US009845250B2

(12) United States Patent
Kang

(10) Patent No.: US 9,845,250 B2
(45) Date of Patent: Dec. 19, 2017

(54) METHOD OF STRETCHING THE DISCHARGE OF PLASMA IN LIQUIDS

(71) Applicant: Energy Onvector, LLC, Camden, NJ (US)

(72) Inventor: Jun Kang, Cherry Hill, NJ (US)

(73) Assignee: ENERGY ONVECTOR, LLC, Camden, NJ (US)

( * ) Notice: Subject to any disclaimer, the term of this patent is extended or adjusted under 35 U.S.C. 154(b) by 194 days.

(21) Appl. No.: 14/698,101

(22) Filed: Apr. 28, 2015

(65) Prior Publication Data

US 2015/0307370 A1    Oct. 29, 2015

Related U.S. Application Data

(60) Provisional application No. 61/985,732, filed on Apr. 29, 2014.

(51) Int. Cl.
| | |
|---|---|
| C02F 1/461 | (2006.01) |
| C02F 1/46 | (2006.01) |
| C02F 103/10 | (2006.01) |
| C02F 103/36 | (2006.01) |
| C02F 103/08 | (2006.01) |

(52) U.S. Cl.
CPC ........ C02F 1/4608 (2013.01); *C02F 2103/08* (2013.01); *C02F 2103/10* (2013.01); *C02F 2103/365* (2013.01); *C02F 2201/4618* (2013.01)

(58) Field of Classification Search
CPC .................................................. C02F 1/4608
See application file for complete search history.

(56) References Cited

U.S. PATENT DOCUMENTS

| | | | |
|---|---|---|---|
| 3,097,292 A | 7/1963 | Kugler et al. | |
| 3,760,145 A | 9/1973 | Wolf et al. | |
| 2008/0099406 A1 | 5/2008 | Ruan et al. | |
| 2010/0219136 A1* | 9/2010 | Campbell | C02F 1/4608 210/748.01 |
| 2011/0031124 A1 | 2/2011 | Hana | |

(Continued)

FOREIGN PATENT DOCUMENTS

WO    2014/108659    7/2014

OTHER PUBLICATIONS

Ahmadun et al., "Review of technologies for oil and gas produced water treatment," Journal of Hazardous Materials, vol. 170, pp. 530-551, 2009.

(Continued)

*Primary Examiner* — Keith Hendricks
*Assistant Examiner* — Salil Jain
(74) *Attorney, Agent, or Firm* — Riverside Law LLP

(57) ABSTRACT

A system and method for stretching the discharge of plasma in a liquid utilizes in certain embodiments a first, second and third electrode within a liquid holding container, a gas injection conduit for introducing a gas such as air or oxygen into the container, and a power supply electrically coupled to at least the second and third electrodes. In certain embodiments, a seed plasma generated by a first and second electrode is stretched, and a larger plasma is generated by a first and third electrode. In certain embodiments, a fourth electrode can be used to further stretch the plasma. An increase in gas introduction flow rate can also be utilized to facilitate the stretching of plasma.

11 Claims, 15 Drawing Sheets

(56) References Cited

U.S. PATENT DOCUMENTS

| | | | |
|---|---|---|---|
| 2011/0062014 A1 | 3/2011 | Gutsol et al. | |
| 2011/0250098 A1 | 10/2011 | Matveev | |
| 2013/0299351 A1* | 11/2013 | Livshitz | C02F 1/4608 204/554 |
| 2014/0210344 A1 | 7/2014 | Foret | |
| 2015/0251933 A1* | 9/2015 | Nakamura | C02F 1/4608 210/748.17 |
| 2016/0074829 A1* | 3/2016 | Kitano | H05H 1/2406 204/164 |

OTHER PUBLICATIONS

McIntyre et al., "Uses of ultraviolet/ozone for hydrocarbon removal: Applications to surfaces of complex composition or geometry," Journal of Vacuum Science & Technology A: Vacuum, Surfaces, and Films, vol. 9, pp. 1355-1359, 1991.

Yang et al., "Removal of CaCO3 scales on a filter membrane using plasma discharge in water," Int. J. Heat Mass Transfer, vol. 52, pp. 4901-4906, 2009.

Yang et al., "Mineral Fouling Control by Underwater Plasma Discharge in a Heat Exchanger," ASME Journal of Heat Transfer, vol. 133, pp. 054502, 2011.

Kim et al., "Concentration of hydrogen peroxide generated by gliding arc discharge and inactivation of *E. coli* in water," International Communications in Heat and Mass Transfer, vol. 42, pp. 5-10, 2013.

Sano et al., "Properties of carbon onions produced by an arc discharge in water," Journal of Applied Physics, 92(5): pp. 2783-2788, 2002.

Lange et al., "Nanocarbon production by arc discharge in water," Carbon, 41(8): pp. 1617-1623, 2003.

Guo et al., "Structure of nanocarbons prepared by arc discharge in water," Materials Chemistry and physics, 105(2): pp. 175-178, 2007.

Mezei, et al., "Electrolyte cathode atmospheric glow discharges for direct solution analysis," Applied Spectroscopy Reviews, 42(6): pp. 573-604, 2007.

Maksimov, A., V. Titov, and A. Khlyustova, "Electrolyte-as-cathode glow discharge emission and the processes of solution-to-plasma transport of neutral and charged species," High Energy Chemistry, 38(3): pp. 196-199, 2004.

Wright, K.C., et al., "New Fouling Prevention Method using a Plasma Gliding Arc for Produced Water Treatment," Desalination, 345: pp. 64-71, 2014.

Czernichowski, et al., "Spectral and electrical diagnostics of gliding arc," Acta Physica Polonica—Series A General Physics, vol. 89, pp. 595-604, 1996.

Mutaf-Yardimci, et al., "Thermal and nonthermal regimes of gliding arc discharge in air flow," Journal of Applied Physics, vol. 87, pp. 1632-1641, 2000.

Kim et al. "Use of plasma gliding arc discharge on the inactivation of *E. coli* in Water," Separation and Purification Technology, 120, pp. 423-428, 2013.

Kim et al. "Residual Effects and energy cost of Gliding Arc Discharge Treatment on the Inactivation of *E. coli* in water" International Journal of Heat and Mass Transfer; Sep. 2014, vol. 77: pp. 1075-1083.

* cited by examiner

METHOD OF STRETCHING THE DISCHARGE OF PLASMA IN LIQUIDS

CROSS-REFERENCE TO RELATED APPLICATIONS

This application claims priority to U.S. provisional application No. 61/985,732 filed on Apr. 29, 2014 incorporated herein by reference in its entirety.

BACKGROUND OF THE INVENTION

Oil and gas production processes generate large volumes of liquid waste. Hydraulic fracturing of shale utilizes high-pressure water to fracture shale formations. The wastewater generated during the drilling phase is called flowback water, whereas the water generated during the production phase is called produced water. Both the flowback and produced waters contain various organic and inorganic components, and discharging produced water can pollute surface and underground water and soil. Since approximately 250 million barrels per day (i.e., ~30 million $m^3$ per day) of produced water are generated globally, an amount that is expected to continue increasing for an extended period of time, there is a growing need for new methods to treat large volumes of produced water robustly and efficiently.

A variety of methods are currently utilized to treat produced water for the purposes of discharge as well as for recycling and reuse in subsequent hydraulic fracturing operations. This diverse set of water treatment techniques include de-oiling (removing dispersed oil and grease), removal of soluble organics, disinfection, suspended solid particle removal, dissolved gas removal (including hydrocarbon gases, carbon dioxide, and hydrogen sulfide), desalination (removing sodium and chloride ions), and water-softening (reducing calcium and magnesium hardness), among others. High voltage (HV) plasma discharges have been studied in application to water for various parameters including removal of dispersed oil/grease and soluble hydrocarbons, water softening, and disinfection.

Plasma is ionized gas. One of the simplest ways to produce a plasma discharge in air is to utilize two electrodes (i.e., a cathode and anode) closely placed in air, i.e., 2-5 mm. When the voltage between the two electrodes increases to a certain value such as 2 kV, breakdown of air between the two electrodes takes place, generating a discharge of plasma. Depending on the magnitude of the voltage across the two electrodes and electrode geometry, a number of different types of plasma discharges can be produced, including corona, spark, and arc type plasmas, among others.

When discharging plasma in liquid, the process can be more complicated if the electric conductivity of the liquid is significantly greater than that of gas. For example, when one tries to generate plasma discharges in municipal tap water, the electric conductivity of tap water (i.e., approximately 0.2-0.8 mS/cm) causes the water to behave as an electric conductor, creating a path for electrons (i.e., a short circuit) thereby preventing breakdown and discharge of plasma in water even if the distance between the two electrodes is kept relatively small such as 3 mm.

In this background example, after applying voltage to municipal tap water for an initial period of time of approximately 10-20 s, a large number of gas bubbles are generated from both electrodes, due to electrolysis. When the gas generated by electrolysis of water between the two electrodes reaches sufficient volume, breakdown can occur, and subsequently plasma is discharged in water. Once the initial breakdown and plasma discharge takes place, the high temperature of plasma (approximately 2,000 K) produces additional gas bubbles between the two electrodes, and plasma discharge can be sustained.

When the electric conductivity of liquid is significantly larger than that of typical municipal tap water, plasma discharge typically does not take place unless gas is supplied to the water at the electrode from an external source such as a compressor or gas tank. In the case of industrial wastewater produced from hydraulic fracturing of shale for oil and gas (produced water), the electric conductivity is very high, approximately 200 mS/cm due to a large amount of dissolved ions such as sodium, calcium, chloride, magnesium, etc. (see Ahmadun et al., "Review of technologies for oil and gas produced water treatment," *Journal of Hazardous Materials*, vol. 170, pp. 530-551, 2009). Due to this high electrolytic conductivity, produced water provides a special challenge for the generation of plasma discharge, but at the same time unique opportunity, if one can successfully discharge plasma in produced water, that can be applied for the removal of dispersed oil/grease and soluble hydrocarbons (see McIntyre et al., "Uses of ultraviolet/ozone for hydrocarbon removal: Applications to surfaces of complex composition or geometry," *Journal of Vacuum Science & Technology A: Vacuum, Surfaces, and Films*, vol. 9, pp. 1355-1359, 1991), water softening (see Yang et al., "Removal of CaCO3 scales on a filter membrane using plasma discharge in water," *Int. J. Heat Mass Transfer*, vol. 52, pp. 4901-4906, 2009; and Yang et al., "Mineral Fouling Control by Underwater Plasma Discharge in a Heat Exchanger," *ASME Journal of Heat Transfer*, vol. 133, p. 054502, 2011), and disinfection (see Kim et al., "Concentration of hydrogen peroxide generated by gliding arc discharge and inactivation of *E. coli* in water," *International Communications in Heat and Mass Transfer*, vol. 42, pp. 5-10, 2013).

In such high electric-conductivity liquid, electrons instantly and continually flow from cathode to anode as the high electric conductivity liquid provides an effective path for electrons to flow, a phenomenon that can be referred as leakage between the two electrodes. In such cases, the injection of gas between the two electrodes can create a barrier to stop the flow of electrons between the two electrodes, assisting in the process of breakdown of liquid, such that plasma discharges can be generated in high electric-conductivity liquid using moderately high voltages of 1-3 kV.

When gas injection is utilized to assist the generation of plasma discharges in high electric-conductivity liquid, it is essential to have sufficiently large-size gas bubbles that can fill the space between the two electrodes. Typically, assuming the gap distance used between the two electrodes in liquid is 2-3 mm, it is desirable to generate gas bubbles of at least 2-3 mm or greater to ensure that plasma discharges take place between the electrodes in liquid.

Flow rates in the treatment of produced water can be in a wide range from 1 L/s to 300 L/s. For efficient treatment of larger produced water flow rates, there is a concomitant need to have increasingly large plasma discharges. If the plasma discharge can be stretched from within a 2-mm space to a much larger liquid space, for example, >5 cm in length, treatment efficiency can be increased dramatically.

The high electric conductivity of produced water that makes plasma difficult to ignite, as produced water often behaves as a short circuit. However, liquids having extremely low electric conductivity, as in the case of hydrocarbon fuels such as jet fuel (JP-8) and diesel, also present challenges in discharging plasma. What is needed in the art are improved systems and methods for stretching plasmas in both high and low conductivity liquids.

SUMMARY OF THE INVENTION

In one embodiment, a system for stretching the discharge of plasma in a liquid includes a container configured to hold a liquid; a first electrode, a second electrode and a third electrode disposed within the container; a gas injection conduit configured to introduce a gas into the container between the first electrode and the second electrode; and a power supply electrically coupled to the second and third electrode with a first switch electrically coupled between the power supply and the second electrode. In certain embodiments, the first electrode is a ground electrode, and the second and third electrodes are high voltage electrodes. In certain embodiments, the system is configured to operate in a first phase with the first switch closed, and continue operation in a second phase with the first switch open. In certain embodiments, the system is configured to increase a flow rate through the gas injection conduit prior to turning the first switch open. In certain embodiments, the gas injection conduit is connected to a gas supply container or an air compressor. In certain embodiments, the gas supply container or air compressor includes at least one of air or oxygen. In certain embodiments, the container has an open top. In certain embodiments, a fourth electrode disposed within the container and electrically coupled to the power supply. In certain embodiments, the fourth electrode is a high voltage electrode. In certain embodiments, a second switch is electrically coupled between the third electrode and the power supply. In certain embodiments, the system is configured to operate in a first phase with the first and second switch closed, and continue operation in a second phase with the first switch open and the second switch closed, and continue operation in a third phase with the first and second switch open.

In another embodiment, a method for stretching the discharge of plasma in a liquid includes holding the liquid in a container including a first, second and third electrode, where a first spacing between the first and second electrode is less than a second spacing between the second and third electrode; introducing a gas between the first and second electrode to generate a group of bubbles; generating a first plasma discharge between the first and second electrodes; and generating a second plasma discharge between the first and third electrodes after the step of generating the first plasma discharge, where a size of the second plasma discharge is greater than a size of the first plasma discharge. In certain embodiments, the size of the first plasma discharge is substantially between 2 mm and 3 mm. In certain embodiments, the size of the second plasma discharge is greater than 2 cm. In certain embodiments, the size of the second plasma discharge is greater than 4 cm. In certain embodiments, the size of the second plasma discharge is between 10 and 20 times greater than the size of the first plasma discharge. In certain embodiments, the size of the second plasma discharge is between 15 and 20 times greater than the size of the first plasma discharge. In certain embodiments, a flow rate of the gas increases prior to the step of generating the second plasma discharge. In certain embodiments, the container has an open top. In certain embodiments, a fourth electrode is disposed within the container, the method further includes the step of generating a third plasma discharge between the first and fourth electrodes after the step of generating the second plasma discharge, where a size of the third plasma discharge is greater than the size of the second plasma discharge.

In yet another embodiment, a system for stretching the discharge of plasma in a liquid includes a container configured to hold a liquid; a first electrode and a second electrode disposed within the container; a gas injection conduit configured to introduce a gas into the container between the first electrode and the second electrode; and a power supply electrically coupled to first electrode; where the second electrode is connected to a linear displacement system configured to move the second electrode away from the first electrode. In certain embodiments, the linear displacement system includes a motor, a rotating screw rod, a rack-and-pinion device and a supporting structure. In certain embodiments, the first electrode is a ground electrode, and the second electrode is a high voltage electrode. In certain embodiments, the linear displacement system is configured to move the second electrode away from the first electrode during operation. In certain embodiments, the system is configured to increase a flow rate through the gas injection conduit prior to turning the first switch open. In certain embodiments, the gas injection conduit is connected to a gas supply container. In certain embodiments, the gas supply container comprises at least one of air or oxygen. In certain embodiments, the container has an open top.

In yet another embodiment, a method for stretching the discharge of plasma in a liquid includes the steps of holding the liquid in a container including a first and second electrode; introducing a gas between the first and second electrode to generate a group of bubbles; generating a first plasma discharge between the first and second electrodes; and moving the second electrode away from the first electrode to increase the size of the plasma discharge. In certain embodiments, the first electrode is positioned between 2 mm and 4 mm of the second electrode to generate the first plasma discharge. In certain embodiments, a flow rate of the gas increases prior to the step of generating the second plasma discharge. In certain embodiments, the container has an open top.

In yet another embodiment, a system for stretching the discharge of plasma in a liquid includes a container configured to hold a liquid, the container including an inlet and an outlet; a first electrode, a second electrode and a third electrode disposed within the container; a gas injection conduit configured to introduce a gas into the container between the first electrode and the second electrode; and a power supply electrically coupled to the second and third electrode with a first switch electrically coupled between the power supply and the second electrode; where the inlet and the outlet are configured so that the fluid has to traverse an area defined between the first electrode and the third electrode. In certain embodiments, the first electrode is a ground electrode, and the second and third electrodes are high voltage electrodes. In certain embodiments, the system is configured to operate in a first phase with the first switch closed, and continue operation in a second phase with the first switch open. In certain embodiments, the system is configured to increase a flow rate through the gas injection conduit prior to turning the first switch open. In certain embodiments, the gas injection conduit is connected to a gas supply container. In certain embodiments, the gas supply container comprises at least one of air or oxygen. In certain embodiments, the container has a closed top. In certain embodiments, the system includes a fourth electrode disposed within the container and electrically coupled to the power supply, where the inlet and the outlet are configured so that the fluid has to traverse an area defined between the first electrode and the fourth electrode. In certain embodiments, the fourth electrode is a high voltage electrode. In certain embodiments, a second switch is electrically coupled between the third electrode and the power supply. In certain embodiments, the system is configured to operate in a first phase with the first and second switch closed, and continue operation in a second phase with the first switch open and the second switch closed, and continue operation in a third phase with the first and second switch open.

In yet another embodiment, a method for stretching the discharge of plasma in a liquid includes holding the liquid in a container including a first, second and third electrode, where a first spacing between the first and second electrode is less than a second spacing between the second and third electrode; introducing a gas between the first and second electrode to generate a group of bubbles; generating a first plasma discharge between the first and second electrodes; generating a second plasma discharge between the first and third electrodes after the step of generating the first plasma discharge, where a size of the second plasma discharge is greater than a size of the first plasma discharge; and generating a flow of the liquid so that the flow traverses an area defined between the first electrode and the third electrode. In certain embodiments, a flow rate of the gas increases prior to the step of generating the second plasma discharge. In certain embodiments, a fourth electrode is disposed within the container, and the method further includes the steps of generating a third plasma discharge between the first and fourth electrodes after the step of generating the second plasma discharge, where a size of the third plasma discharge is greater than the size of the second plasma discharge; and generating a flow of the liquid so that the flow traverses an area defined between the first electrode and the fourth electrode.

In yet another embodiment, a system for stretching the discharge of plasma in a liquid includes a container configured to hold a liquid; a first electrode, a second electrode and a third electrode disposed within the container; a conductive structure suspended between the first and third electrode; a gas injection conduit configured to introduce a gas into the container between the first electrode and the second electrode; and a power supply electrically coupled to the second and third electrode with a first switch electrically coupled between the power supply and the second electrode. In certain embodiments, the conductive structure comprises at least one of a metal mesh and a wire.

The condition that makes this stretching of a plasma discharge possible in certain embodiments is the high electric conductivity of produced water. Ironically, it is also the high electric conductivity of produced water that makes plasma difficult to ignite, and causes produced water to often behave as a short circuit. Liquids having extremely low electric conductivity (e.g. hydrocarbon fuels), also present challenges in discharging plasma. Embodiments of the invention provide for systems and methods of stretching plasmas in both high and low conductivity liquids.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 13A is a diagram of a cylindrical plasma reactor, plasmatron and power supply, together with the connections between the power supply and high-voltage electrodes. FIGS. 13B and 13C are pictures of arc discharge before (13B) and after (13C) stretching.

DETAILED DESCRIPTION OF THE INVENTION

Figure 1:
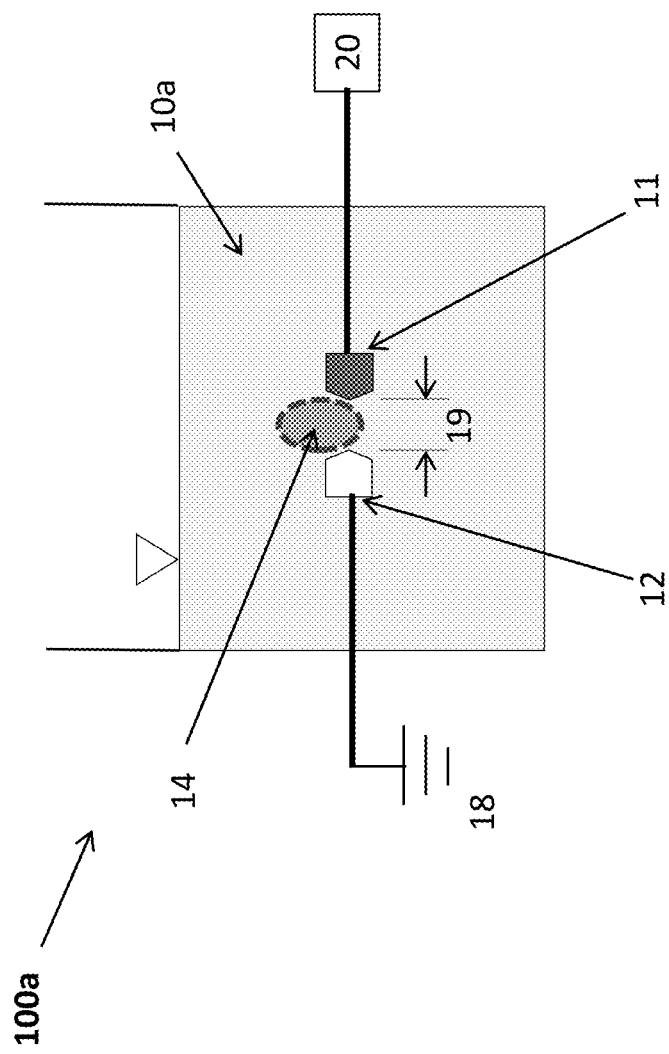
FIG. 1 is a schematic diagram of a prior art system and method for plasma discharge between two electrodes in a plasma reactor, which contains low electric conductivity liquid.

It is to be understood that the figures and descriptions of the present invention have been simplified to illustrate elements that are relevant for a more clear comprehension of the present invention, while eliminating, for the purpose of clarity, many other elements found in systems and methods for stretching plasmas in both high and low conductivity liquids. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

"High conductivity" liquid is defined generally as liquid solutions over 10 mS/cm. "Low conductivity" liquid is defined generally as liquid solutions less than 2 mS/cm.

To "Stretch" or "Stretching" as used herein means an increase in volume, area or size.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein are devices, systems and methods for stretching plasmas in both high and low conductivity liquids.

With reference now to prior art FIG. 1, plasma discharge 14 is generated without the help of gas injection between two electrodes (i.e., ground electrode 12 and high-voltage electrode 11) with a relatively small gap distance of 2-5 mm 19 in a plasma reactor 100a, which contains low electric conductivity liquid 10a. When the electric conductivity is low, for example 0.2-0.8 mS/cm, electrons cannot flow easily between the two electrodes due to large resistance. Thus, when the voltage across the two electrodes is relatively high, for example 2 kV, the breakdown of low electric conductivity liquid 10a occurs, resulting in the plasma discharge 14.

Figure 2:
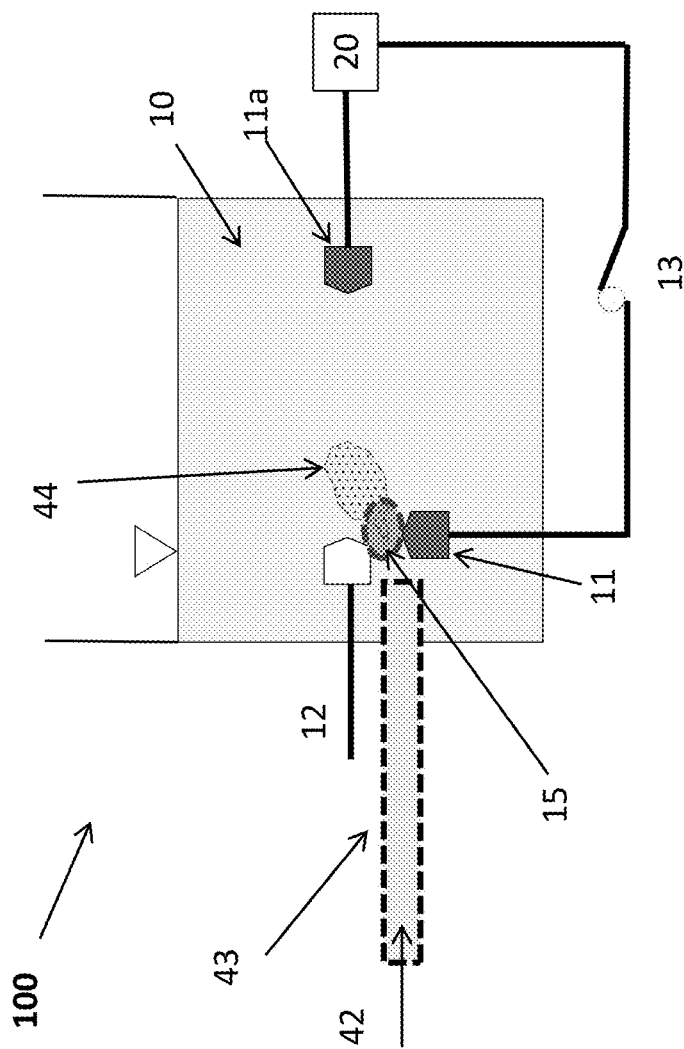
FIG. 2 is a schematic diagram of a plasma reactor filled with high-conductivity liquid according to an exemplary embodiment of the invention, which includes of a pair of electrodes (i.e., ground electrode and primary high-voltage electrode), the second high-voltage electrode, gas-injection tube, switch, and high-voltage power supply.
Figure 3:
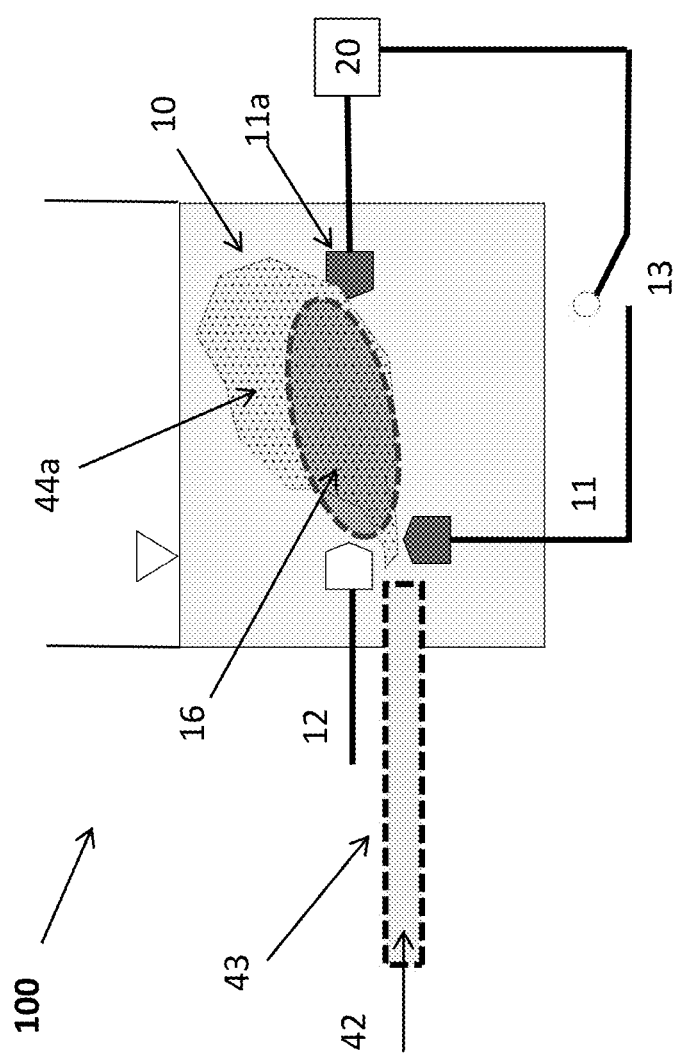
FIG. 3 is a schematic diagram of a plasma reactor filled with high-conductivity liquid according to the exemplary embodiment shown in FIG. 2, where plasma discharge is stretched from the primary high-voltage electrode to the second high-voltage electrode by disconnecting switch to the primary electrode.

Referring now to the exemplary embodiment of FIGS. 2 and 3, an open-top plasma reactor 100 filled with high conductivity liquid 10 includes a pair of electrodes (i.e., ground electrode 12 and primary high-voltage electrode 11), the second high-voltage electrode 11a, gas-injection tube 43, switch 13, and high-voltage power supply 20. Compressed gas 42 such as air or oxygen is injected to a gap between the ground electrode 12 and primary high-voltage electrode 11 in a plasma reactor 100, forming a group of gas bubbles 44 in high electric conductivity liquid 10. When switch 13 is closed, the primary high-voltage electrode 11 is connected to the high-voltage line in power supply 20, generating a relatively small size plasma 15 between the ground electrode 12 and primary high-voltage electrode 11, which is referred to as "seed plasma discharge 15". Although the second high-voltage electrode 11a is also connected to the high-voltage line in power supply 20, the second high-voltage electrode 11a does not participate in the generation of plasma discharge. In certain embodiments, the grounding electrode is in circuit with the power supply. In alternate embodiments, the grounding electrode is grounded out of circuit with the power supply.

When the switch 13 to the primary high-voltage electrode 11 is open (i.e., disconnected) as shown in FIG. 3, the primary high-voltage electrode 11 is disconnected from the high-voltage line in power supply 20. At this moment, the seed plasma stretches into a larger plasma discharge 16 to the second high-voltage electrode 11a via the high electric conductivity liquid 10. Prior to initiating stretching, it is useful to increase the flow rate of gas 42 so that the size of gas bubble pool 44a increases. Note that the high electric conductivity liquid 10 poses practically no resistance to the flow of electrons so that as soon as the primary high-voltage electrode 11 is disconnected, the seed plasma discharge jumps almost instantly to the second high-voltage electrode 11a, generating a stretched plasma discharge 16. The size of the stretched plasma discharge 16 is determined by the distance between the ground electrode 12 and the second high-voltage electrode 11a. For example, when the second high-voltage electrode 11a is positioned at a location 5 cm from the ground electrode 12, the size of the stretched plasma discharge 16 can be as big as 5 cm. Compared to the size of the seed plasma discharge of 2-3 mm, the stretched plasma discharge of 5 cm is about 15-20 times greater than the seed plasma discharge.

Figure 4:
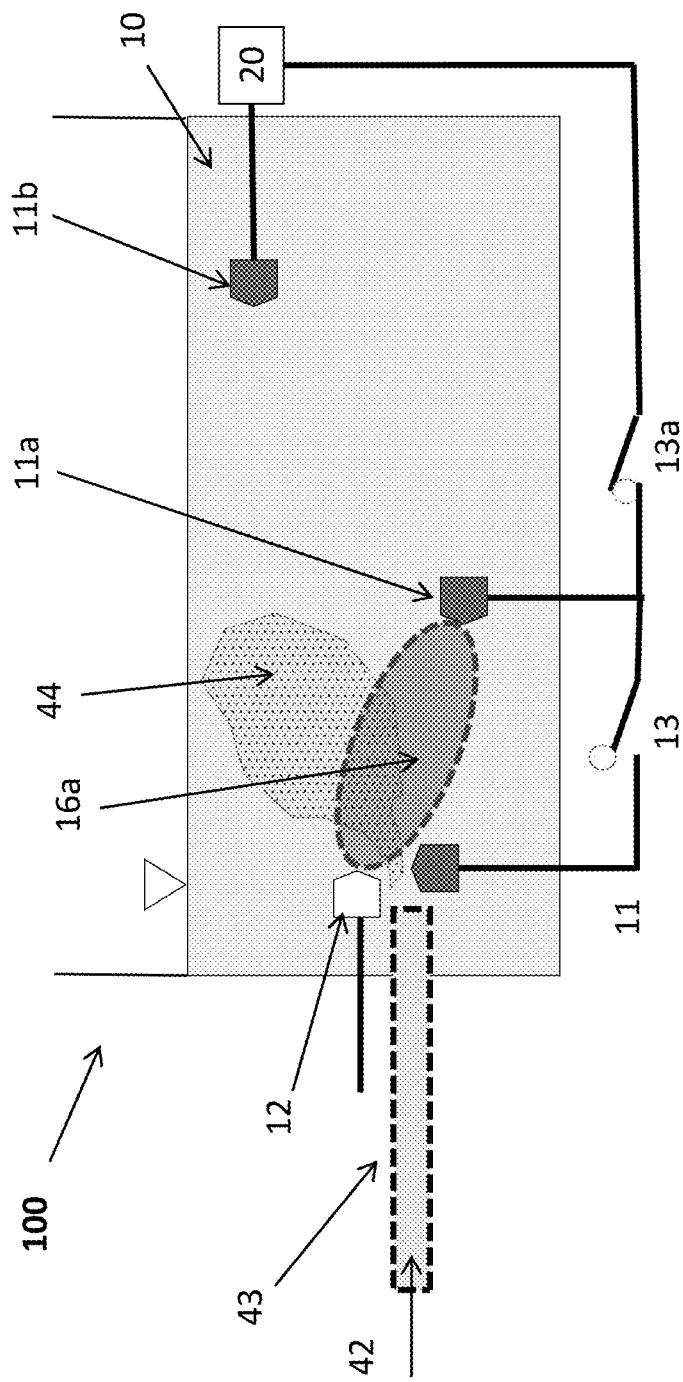
FIG. 4 is a schematic diagram of a plasma reactor filled with high-conductivity liquid according to an exemplary embodiment of the invention, which includes a pair of electrodes (i.e., ground electrode and primary high-voltage electrode), the second and third high-voltage electrodes, gas-injection tube, two switches, and high-voltage power supply. Plasma discharge is stretched from the primary high-voltage electrode to the second high-voltage electrode by disconnecting the switch to the first electrode.
Figure 5:
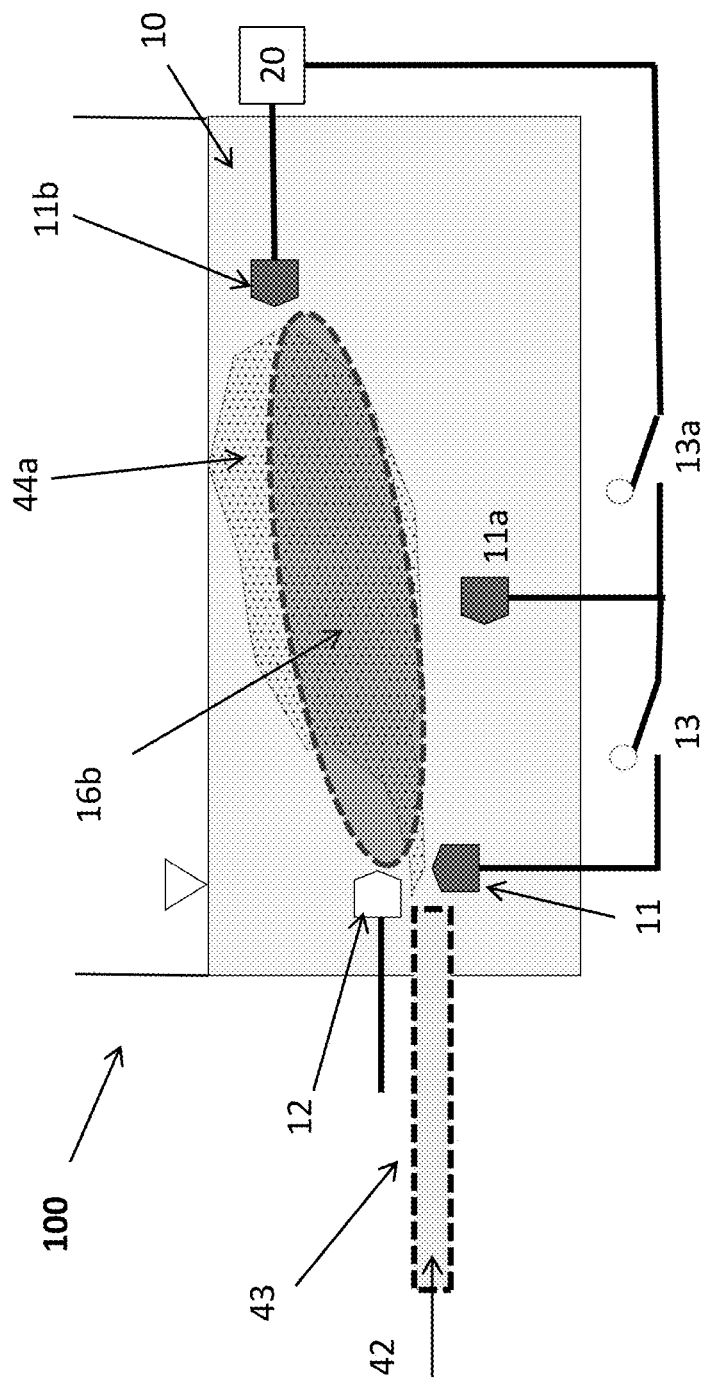
FIG. 5 is a schematic diagram of a plasma reactor according to an exemplary embodiment of the invention, which includes of a pair of electrodes (i.e., ground electrode and primary high-voltage electrode), the second and third high-voltage electrodes, gas-injection tube, two switches, and high-voltage power supply. Plasma discharge is stretched from the second high-voltage electrode to the third high-voltage electrode by disconnecting the switch to the second electrode.

Referring now to the exemplary embodiment of FIGS. 4 and 5, a multiple high-voltage electrode system is shown, and a system and method for stretching plasma discharge among multiple high-voltage electrodes 11, 11a, and 11b in open-top plasma reactor 100 filled with high electric conductivity liquid 10 is disclosed. A plasma reactor 100 includes a pair of electrodes (i.e., ground electrode 12 and primary high-voltage electrode 11), the second high-voltage electrode 11a, third high-voltage electrode 11b, gas-injection tube 43, multiple switches 13 and 13a, and high-voltage power supply 20. First, the switches 13 and 13a are closed (i.e., connected) engaging the primary high-voltage electrode 11 and generating seed plasma discharge between the ground electrode 12 and the primary high-voltage electrode 11. Then, when switch 13 to the primary high-voltage electrode 11 is open (i.e., disconnected, see FIG. 4), the primary high-voltage electrode 11 is disconnected from the high-voltage line in power supply 20. At this moment, the seed plasma discharge 15 jumps to the second high-voltage electrode 11a via the high electric conductivity liquid 10. Note that the high electric conductivity liquid 10 poses practically no resistance to the flow of electrons so that as soon as the primary high-voltage electrode 11 is disconnected, the seed plasma discharge 15 jumps almost instantly to the second high-voltage electrode 11a, generating a stretched plasma discharge 16 between the ground electrode 12 and the second high-voltage electrode 11a.

When the switch 13a to the second high-voltage electrode 11b is open (i.e., disconnected, see FIG. 5), the second high-voltage electrode 11a is disconnected from the high-voltage line in power supply 20. At this moment, the stretched plasma discharge 16a jumps to the third high-voltage electrode 11b via the high electric conductivity liquid 10. Prior to initiating stretching, it is useful to increase the flow rate of gas 42 so that the size of gas bubble pool 44a increases. Note that the high electric conductivity liquid 10 poses practically no resistance to the flow of electrons so that as soon as the secondary high-voltage electrode 11a is disconnected, the stretched plasma discharge jumps almost instantly to the third high-voltage electrode 11b, generating a stretched plasma discharge 16a between the ground electrode 12 and the third high-voltage electrode 11b.

Figure 6:
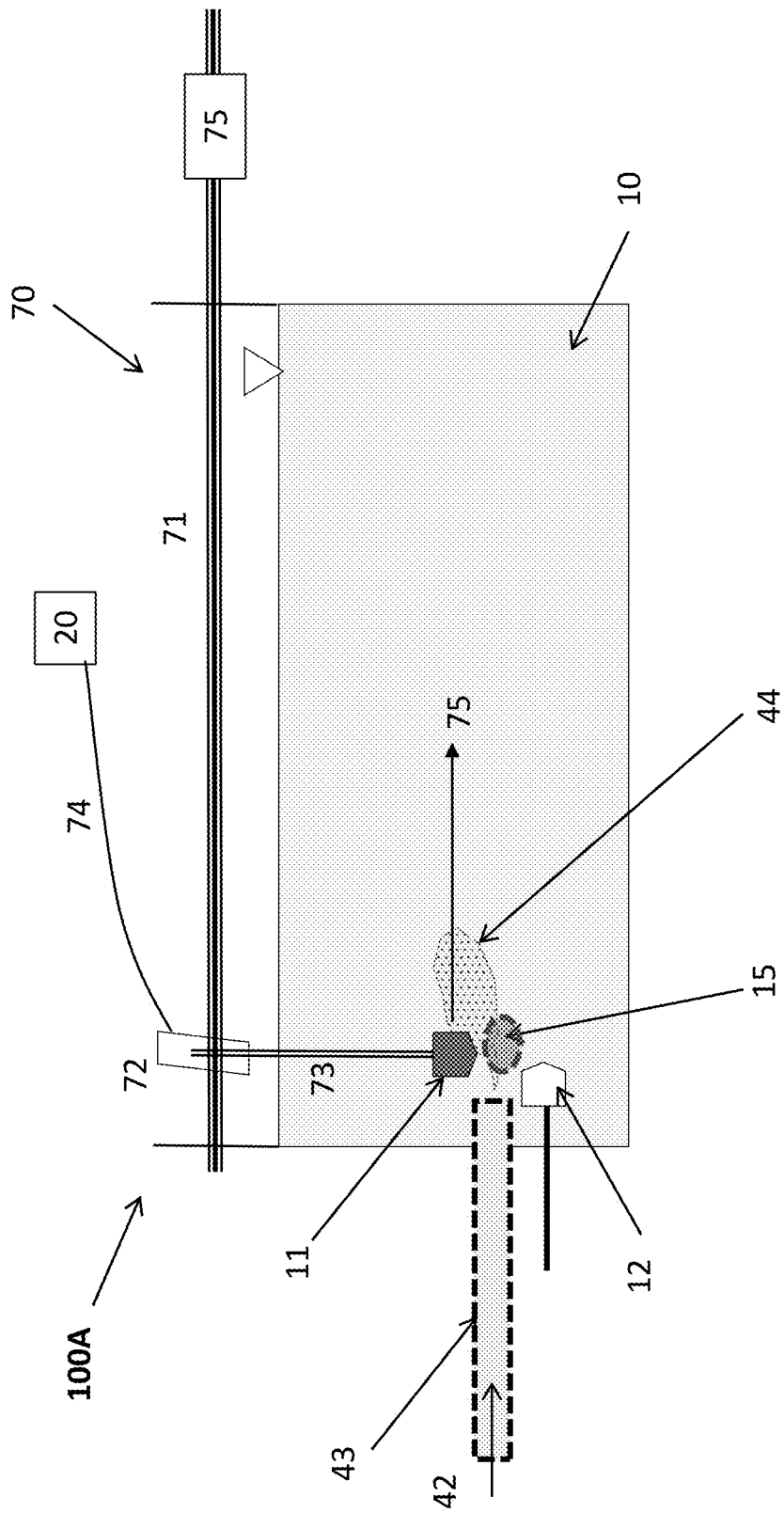
FIG. 6 is a schematic diagram of a plasma reactor according to an exemplary embodiment of the invention, which includes a pair of electrodes (i.e., ground electrode and high-voltage electrode), gas-injection tube, high-voltage power supply, and a linear displacement system to move the high-voltage electrode away from the ground electrode in a large open liquid reservoir.
Figure 7:
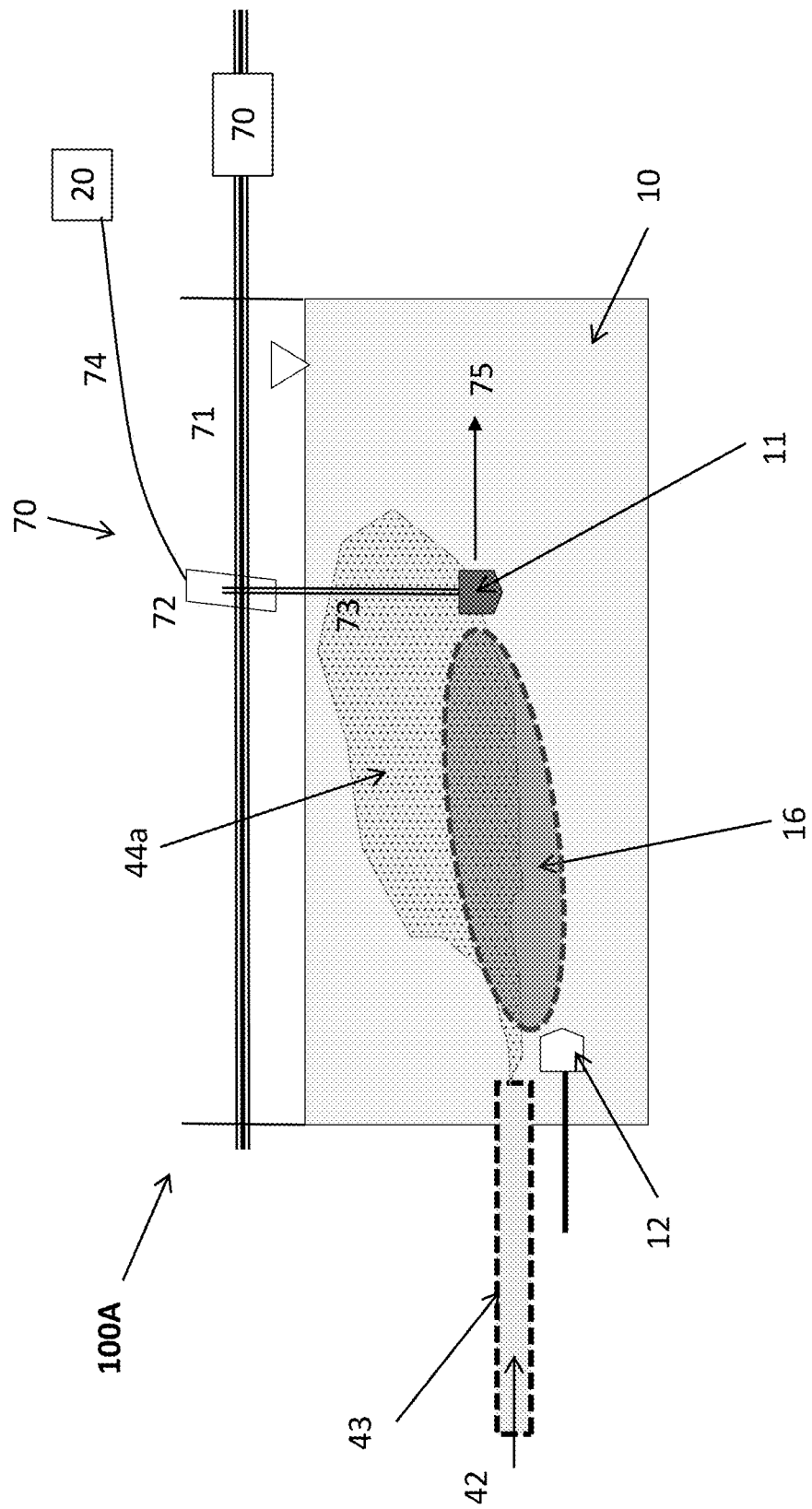
FIG. 7 is a schematic diagram of a plasma reactor according to the exemplary embodiment shown in FIG. 6, where seed plasma discharge is stretched by moving high-voltage electrode.

With reference now to the exemplary embodiment shown in FIGS. 6 and 7, a stretching method of seed plasma discharge using a linear displacement system 70 in a large open liquid reservoir (or pond) 100A that contains high electric conductivity liquid 10 is described. The plasma reactor includes a pair of electrodes (i.e., ground electrode 12 and high-voltage electrode 11), gas-injection tube 43, high-voltage power supply 20, and a linear displacement system 71 to move the high-voltage electrode 11 away from the ground electrode 12 in a large open liquid reservoir 100A. The linear displacement system 70 includes a motor 75, a long rotating screw rod 71, rack-and-pinion type device 72, a supporting structure 73 to hold high-voltage electrode 11. Initially, seed plasma discharge 15 is generated between the ground electrode 12 and high-voltage electrode 11, when the high-voltage electrode 11 is positioned close to the ground electrode 12 within 2-4 mm (see FIG. 6).

A linear displacement system 70 gradually moves the high-voltage electrode 11 away from the ground electrode 12 along the predetermined linear path 71 in a large open liquid reservoir 100A. Then, the seed plasma discharge 15 is stretched by the motion of the high-voltage electrode 11 via the high electric conductivity liquid 10 (see FIG. 7). Prior to initiating stretching, it is useful to increase the flow rate of gas 42 so that the size of gas bubble pool 44a increases. Note that the high electric conductivity liquid 10 poses practically no resistance for the seed plasma discharge to be stretched. It should be appreciated that any one or more of the electrodes can be designed to move independently or simultaneously for stretching the plasma.

Figure 8:
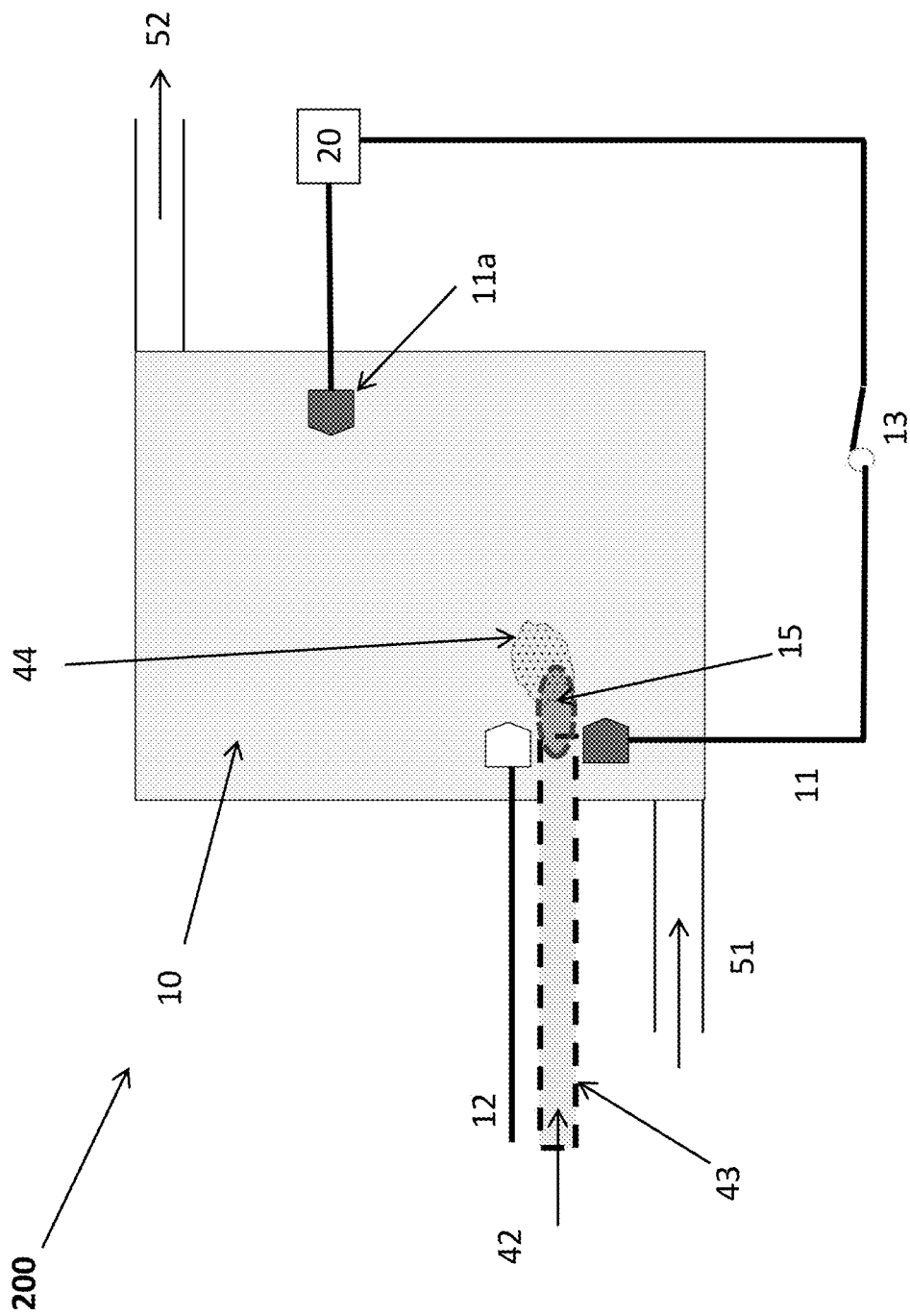
FIG. 8 is a schematic diagram of a closed plasma reactor with liquid inlet and outlet according to an exemplary embodiment of the invention, which includes a pair of electrodes (i.e., ground electrode and primary high-voltage electrode), the second high-voltage electrode, gas-injection tube, switch, and high-voltage power supply.
Figure 9:
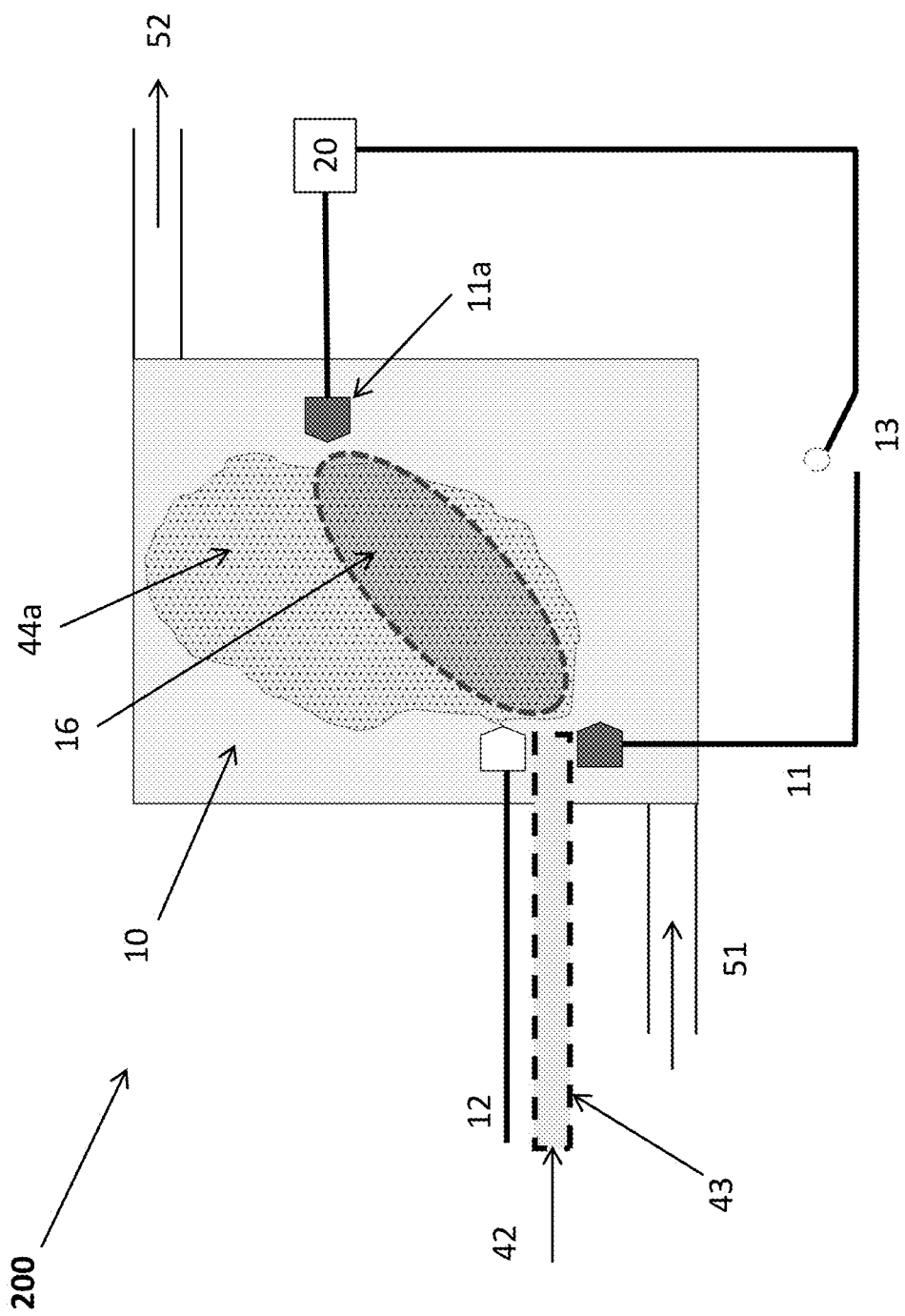
FIG. 9 is a schematic diagram of a closed plasma reactor according to the exemplary embodiment shown in FIG. 8, where seed plasma discharge is stretched to the second high-voltage electrode after switch is disconnected.

With reference now to the exemplary embodiment shown in FIGS. 8 and 9, a plasma reactor 200 filled with high conductivity liquid 10 includes a pair of electrodes (i.e., ground electrode 12 and primary high-voltage electrode 11), the second high-voltage electrode 11a, gas-injection tube 43, switch 13, high-voltage power supply 20, and liquid inlet 51 and outlet 52. Compressed gas 42 such as air or oxygen is injected to the gap between the ground electrode 12 and primary high-voltage electrode 11 in a plasma reactor 200, forming a group of gas bubbles 44 in high electric conductivity liquid 10. When switch 13 is closed (i.e., connected, see FIG. 8), the primary high-voltage electrode 11 is connected to the high-voltage line in power supply 20, generating a relatively small size plasma 15 between the ground electrode 12 and primary high-voltage electrode 11, which is referred as "seed plasma discharge 15". Although the second high-voltage electrode 11a is also connected to the high-voltage line in power supply 20, the second high-voltage electrode 11a does not participate in the generation of plasma discharge.

The seed plasma discharge (not shown) is first generated between the ground electrode 12 and the primary high-voltage electrode 11, while keeping the switch 13 to the primary high-voltage electrode 11 is closed (i.e., connected). Then, when the switch 13 to the primary high-voltage electrode 11 is open (i.e., disconnected, see FIG. 9), the primary high-voltage electrode 11 is disconnected from the high-voltage line in power supply 20. At this moment, the plasma discharge 16 stretches to the second high-voltage electrode 11a via the electric conductivity liquid 10, while high electric conductivity liquid 10 continuously enters through liquid inlet 51 and exits through liquid outlet 52. Prior to initiating stretching, it is useful to increase the flow rate of gas 42 so that the size of gas bubble pool 44a increases. Note that the high electric conductivity liquid 10 poses practically no resistance to the flow of electrons so that as soon as the primary high-voltage electrode 11 is disconnected, the seed plasma discharge jumps almost instantly to the second high-voltage electrode 11a, generating a stretched plasma discharge 16. The size of the stretched plasma discharge 16 is determined by the distance between the ground electrode 12 and the second high-voltage electrode 11a. For example, when the second high-voltage electrode 11a is positioned at a location 5 cm from the ground electrode 12, the size of the stretched plasma discharge 16 becomes as big as 5 cm. Compared to the size of the seed plasma discharge of 2-3 mm, the stretched plasma discharge of 5 cm is about 15-20 times greater than the seed plasma discharge.

Figure 10:
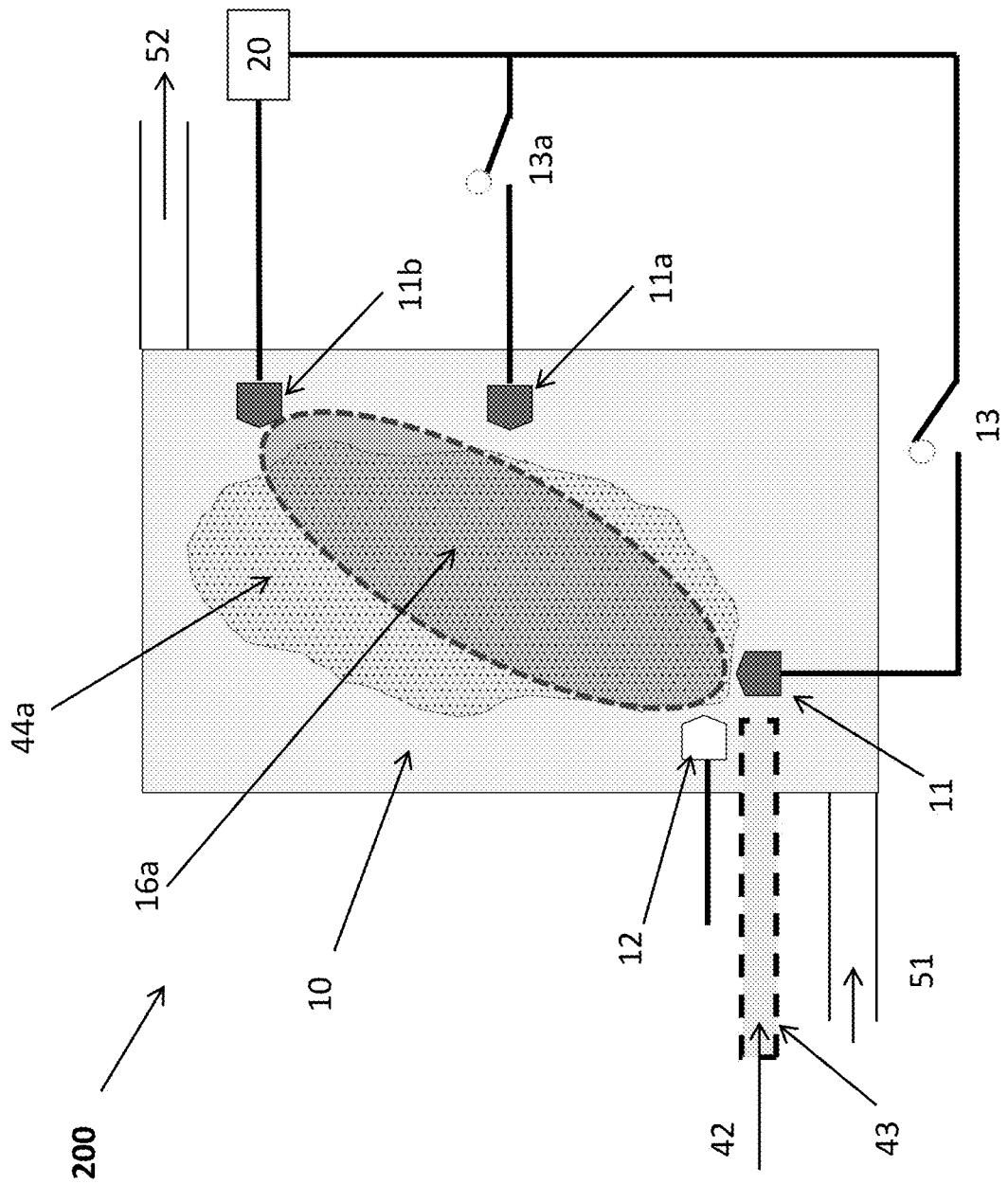
FIG. 10 is a schematic diagram of a closed plasma reactor according to an exemplary embodiment of the invention, which includes a pair of electrodes (i.e., ground electrode and primary high-voltage electrode), the second and third high-voltage electrodes, gas-injection tube, two switches, and high-voltage power supply. Plasma discharge is stretched from the second high-voltage electrode to the third high-voltage electrode by disconnecting switch to the second electrode.

With reference now to the exemplary embodiment of FIG. 10, a system and method for stretching plasma discharge among multiple high-voltage electrodes 11, 11a, and 11b is described now in a plasma reactor 200 containing high electric conductivity liquid 10 with liquid inlet 51 and outlet 52. First, the switch 13 to the primary high-voltage electrode 11 is closed (i.e., connected), generating seed plasma discharge between the ground electrode 12 and the primary high-voltage electrode 11. Then, when the switch 13 to the primary high-voltage electrode 11 is open (i.e., disconnected) while switch 13a is closed (i.e., connected), the primary high-voltage electrode 11 is disconnected from the high-voltage line in power supply 20. At this moment, the seed plasma discharge stretches to the second high-voltage electrode 11a via the high electric conductivity liquid 10. When both switch 13 and 13a are disconnected, the power to both the primary high-voltage electrode 11 and second high-voltage electrode 11a are disconnected from power supply 20. At this moment, the stretched plasma discharge 16a between the ground electrode 12 and second high-voltage electrode 11a stretches to the third high-voltage electrode 11b via the high electric conductivity liquid 10, while high electric conductivity liquid 10 continuously enters through liquid inlet 51 and exits through liquid outlet 52. Prior to initiating jumping, it is useful to increase the flow rate of gas 42 so that the size of gas bubble pool 44a increases.

Figure 11:
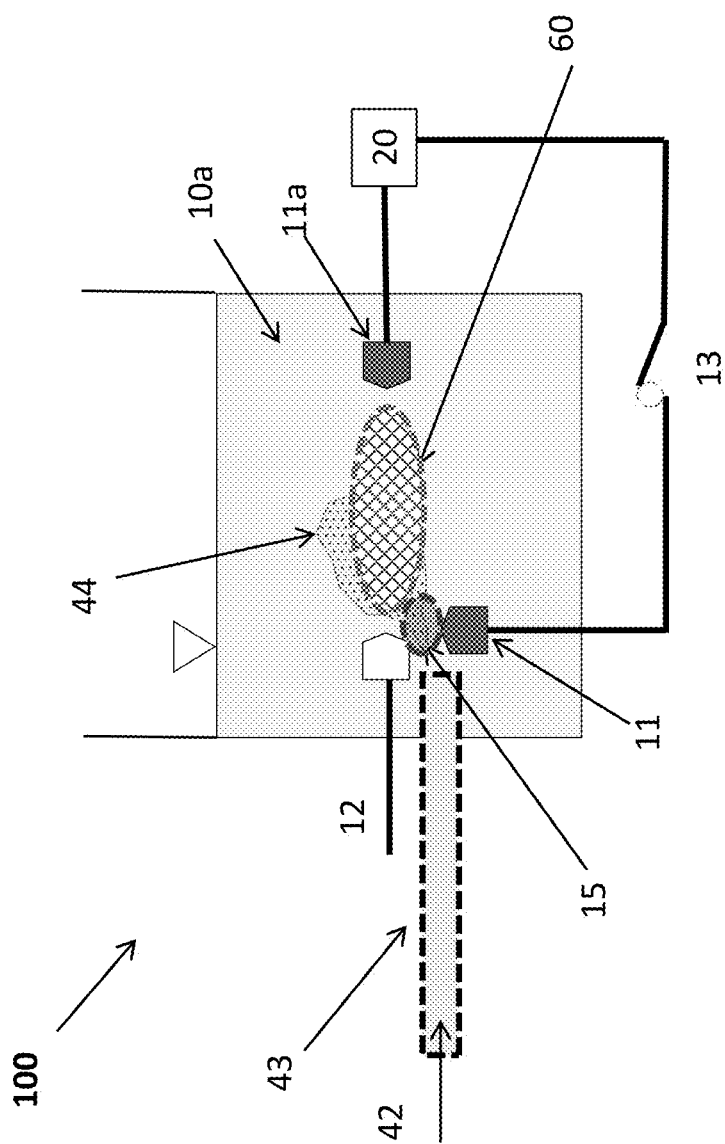
FIG. 11 is a schematic diagram of a plasma reactor containing low electric conductivity liquid according to an exemplary embodiment of the invention, which includes a pair of electrodes (i.e., ground electrode and primary high-voltage electrode), the second high-voltage electrode, gas-injection tube, switch, and high-voltage power supply. A conductive structure is installed between the primary and second high-voltage electrodes to assist jumping of seed plasma discharge.

Referring now to the exemplary embodiment shown in FIG. 11, a system and method for stretching plasma discharge in an open-top plasma reactor 100 filled with low electric conductivity liquid 10a is described. The plasma reactor 100 filled with low conductivity liquid 10a, including hydrocarbon fuels, consists of a pair of electrodes (i.e., ground electrode 12 and primary high-voltage electrode 11), the second high-voltage electrode 11a, gas-injection tube 43, switch 13, and high-voltage power supply 20. In particular, a conductive structure 60, which can be a metal mesh or wire, suspended in low-conductivity liquid 10a is utilized to assist the stretching of seed plasma discharge 15. Compressed gas 42 such as air or oxygen is injected to a gap between the ground electrode 12 and primary high-voltage electrode 11 in a plasma reactor 100, forming a group of gas bubbles 44 in low electric conductivity liquid 10a. When switch 13 is closed, the primary high-voltage electrode 11 is connected to the high-voltage line in power supply 20, generating small size plasma 15 between the ground electrode 12 and primary high-voltage electrode 11, which is referred as "seed plasma discharge 15". Although the second high-voltage electrode 11a is also connected to the high-voltage line in power supply 20, the second high-voltage electrode 11a does not participate in the generation of plasma discharge.

Figure 12:
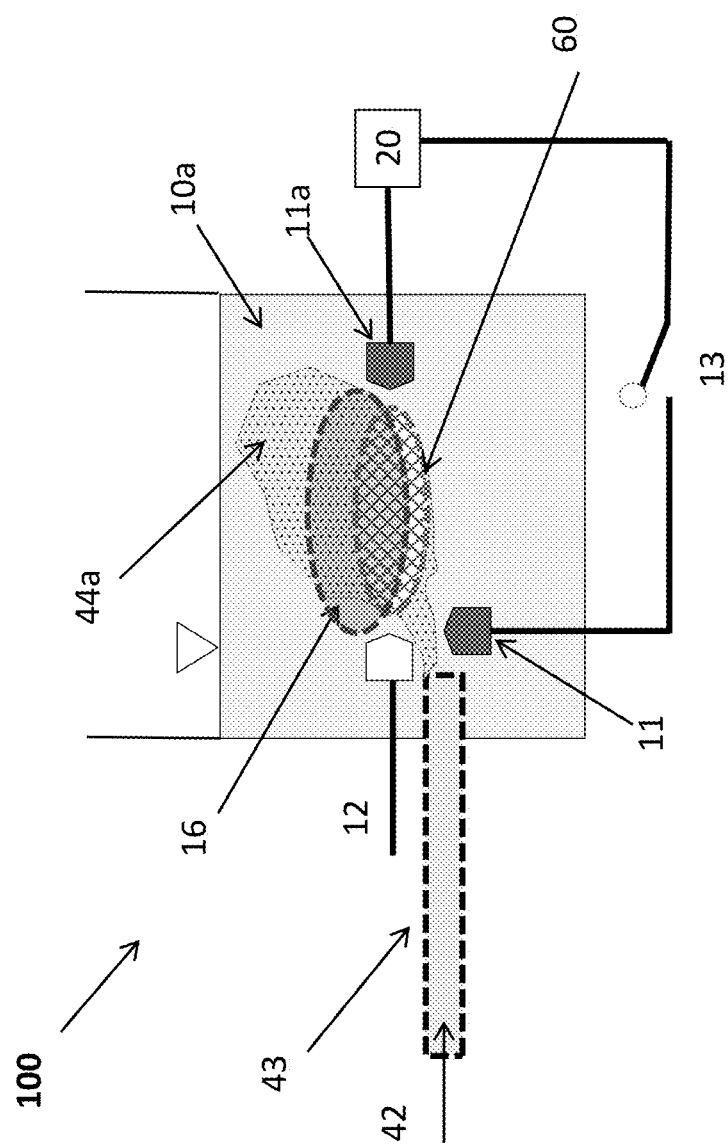
FIG. 12 is a schematic diagram of a plasma reactor according to the embodiment shown in FIG. 11, where plasma discharge is stretched with the help of a conductive structure from the primary high-voltage electrode to the second high-voltage electrode by disconnecting switch to the primary electrode.

Referring now to FIG. 12, a system and method for stretching plasma discharge in low electric conductivity liquid 10a in an open-top plasma reactor 100 having a metal structure 60 is described. First, the switch 13 to the primary high-voltage electrode 11 is closed (i.e., connected), generating a seed plasma discharge between the ground electrode 12 and the primary high-voltage electrode 11. When the switch 13 to the primary high-voltage electrode 11 is open (i.e., disconnected), the primary high-voltage electrode 11 is disconnected from the high-voltage line in power supply 20. At this moment, the seed plasma discharge stretches to the second high-voltage electrode 11a with the help of the conductive structure 60, which can be a metal mesh or wire, in spite of the low electric conductivity liquid 10a. Since the low electric conductivity liquid 10a poses a significant resistance to the seed plasma discharge so that when the primary high-voltage electrode 11 is disconnected, the seed plasma discharge cannot jump to the second high-voltage electrode 11a without the conductive structure 60. Prior to initiating stretching, it is useful to increase the flow rate of gas 42 so that the size of gas bubble pool 44a increases. The size of the stretched plasma discharge 16 is determined by the distance between the ground electrode 12 and the second high-voltage electrode 11a. For example, when the second high-voltage electrode 11a is positioned at a location 5 cm from the ground electrode 12, the size of the stretched plasma discharge 16 becomes as big as 5 cm. Compared to the size of the seed plasma discharge of 2-3 mm, the stretched plasma discharge of 5 cm is about 15-20 times greater than the seed plasma discharge. It should be appreciated that a conductive structure can be used in conjunction with any of the embodiments when treating a low conductivity liquid. Further, the conductivity structure can be adjustable in size or area, by for example moving, adjusting or stretching wire mesh, so that the adjustable conductivity structure can change sizes to accommodate a changing distance between moving electrode (such as the embodiment of FIGS. 6 and 7).

A major benefit of the present invention is that it provides a significantly larger size plasma discharge than otherwise possible, not only in high electric conductivity liquid, but also in low electric conductivity liquid. Another major benefit of the present invention is that the plasma power measured in the unit of Watts can be significantly larger from a given power supply when the plasma discharge is stretched in liquid by the present method compared to the power corresponding to seed plasma discharge 15.

Methods according to embodiments of the invention may be as follows. A method for stretching the discharge of plasma in a liquid includes holding the liquid in a container including a first, second and third electrode, where a first spacing between the first and second electrode is less than a second spacing between the second and third electrode; introducing a gas between the first and second electrode to generate a group of bubbles; generating a first plasma discharge between the first and second electrodes; and generating a second plasma discharge between the first and third electrodes after the step of generating the first plasma discharge, where a size of the second plasma discharge is greater than a size of the first plasma discharge. In certain embodiments, the size of the first plasma discharge is substantially between 2 mm and 3 mm. In certain embodiments, the size of the second plasma discharge is greater than 2 cm. In certain embodiments, the size of the second plasma discharge is greater than 4 cm. In certain embodiments, the size of the second plasma discharge is between 10 and 20 times greater than the size of the first plasma discharge. In certain embodiments, the size of the second plasma discharge is between 15 and 20 times greater than the size of the first plasma discharge. In certain embodiments, a flow rate of the gas increases prior to the step of generating the second plasma discharge. In certain embodiments, the container has an open top. In certain embodiments, a fourth electrode is disposed within the container, the method further includes the step of generating a third plasma discharge between the first and fourth electrodes after the step of generating the second plasma discharge, where a size of the third plasma discharge is greater than the size of the second plasma discharge.

In certain embodiments, a method for stretching the discharge of plasma in a liquid includes the steps of holding the liquid in a container including a first and second electrode; introducing a gas between the first and second electrode to generate a group of bubbles; generating a first plasma discharge between the first and second electrodes;

and moving the second electrode away from the first electrode to increase the size of the plasma discharge. In certain embodiments, the first electrode is positioned between 2 mm and 4 mm of the second electrode to generate the first plasma discharge. In certain embodiments, a flow rate of the gas increases prior to the step of generating the second plasma discharge. In certain embodiments, the container has an open top.

Alternatively, a method for stretching the discharge of plasma in a liquid includes holding the liquid in a container including a first, second and third electrode, where a first spacing between the first and second electrode is less than a second spacing between the second and third electrode; introducing a gas between the first and second electrode to generate a group of bubbles; generating a first plasma discharge between the first and second electrodes; generating a second plasma discharge between the first and third electrodes after the step of generating the first plasma discharge, where a size of the second plasma discharge is greater than a size of the first plasma discharge; and generating a flow of the liquid so that the flow traverses an area defined between the first electrode and the third electrode. In certain embodiments, a flow rate of the gas increases prior to the step of generating the second plasma discharge. In certain embodiments, a fourth electrode is disposed within the container, and the method further includes the steps of generating a third plasma discharge between the first and fourth electrodes after the step of generating the second plasma discharge, where a size of the third plasma discharge is greater than the size of the second plasma discharge; and generating a flow of the liquid so that the flow traverses an area defined between the first electrode and the fourth electrode.

EXPERIMENTAL EXAMPLES

This study includes experimental tests conducted with produced water from a shale-oil site and as a demonstration of the arc's capability, this study also briefly examines the effect of the stretching of the arc on the reduction of the concentration of bicarbonate ions in produced water.

Figure 13A:
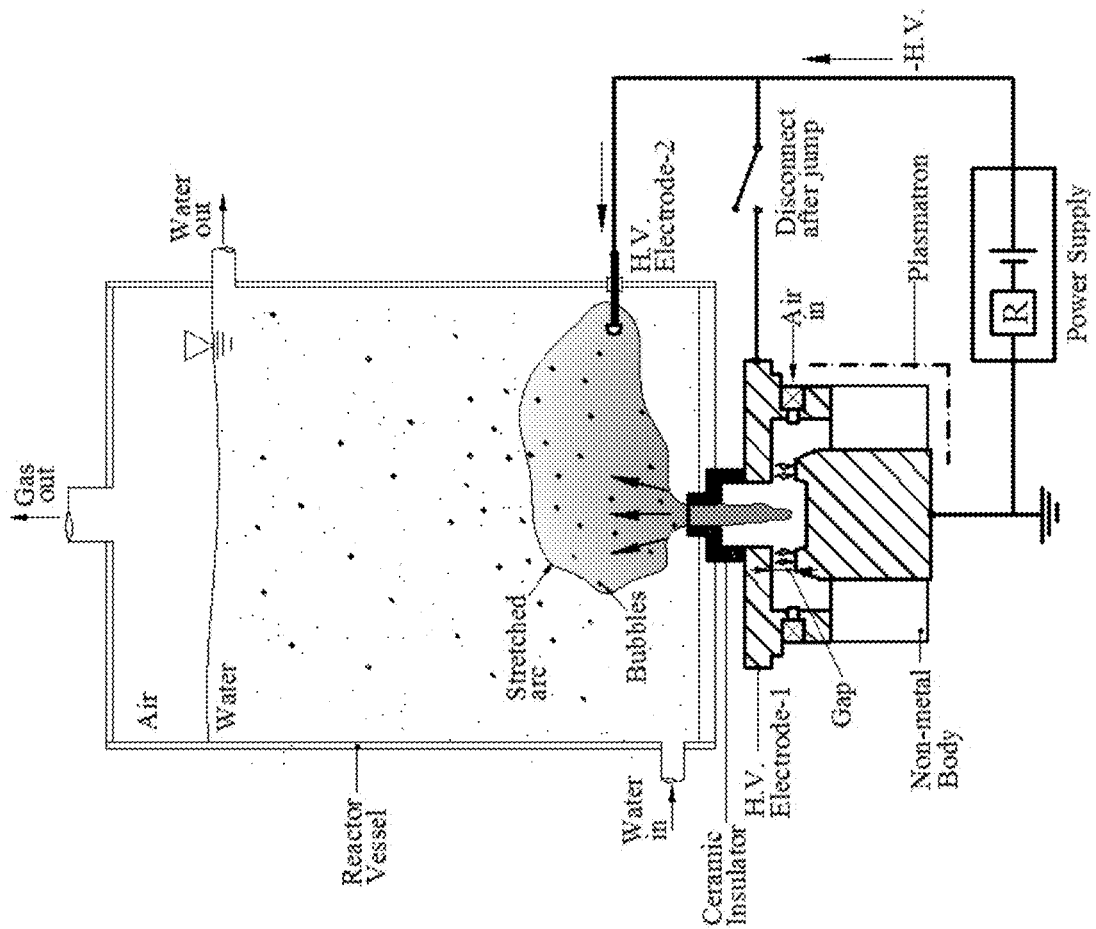
FIGS. 13A-13C are a diagram and pictures of arc discharge associated with experimental examples.

FIG. 13A shows a schematic diagram of the present experimental setup, including a plasma reactor, two water reservoir tanks (not shown), a plasma arc generator (i.e., plasmatron), two HV electrodes, one ground electrode, and a HV DC power supply. The plasma reactor vessel was made up of a non-conducting transparent acrylic cylinder with an inside diameter of 10 cm. Produced water from a shale-oil site (Eagle Ford, Tex.) was pumped to the plasma reactor at a flow rate of 0.1 L/min, and the plasma-treated water continuously moved in a once-through mode to another tank at the same flow rate. Thus, a fixed amount of produced water (i.e., 1.2 L) was maintained in the plasma reactor during the plasma treatment using an overflow water outlet, which was located at the sidewall of the cylinder at 16 cm from the bottom of the vessel as shown in FIG. 13A. The produced water stayed in the plasma reactor for 12 min, which is the duration of plasma treatment. Note that the power supply was a current-limiting (i.e., 0.3 A) type with the maximum voltage of 2 kV at a frequency of 125 kHz.

At the bottom of the reactor vessel, a plasmatron was installed (see Kim, H.-S., et al., *Concentration of hydrogen peroxide generated by gliding arc discharge and inactivation of E. coli in water*. Int. Commun. Heat Mass Transfer, 2013. 42: p. 5-10). Briefly, the plasmatron consisted of two circular ring electrodes separated by 2 mm, and compressed air at a flow rate of 1 scfm was introduced tangentially into the gap surrounded by the two electrodes. The main function of the compressed air was to cool the electrodes as it pushed arc discharge along the circumference of the electrodes. Furthermore, the compressed air prevented water in the reactor vessel from flowing back into the plasmatron. In addition, the injection of compressed air through the plasmatron generated a plasma jet in the reactor vessel, thus helping mixing between water and active plasma species. It should be noted that the plasmatron was designed with a 2-mm gap between the two circular ring electrodes, for a 10-kV open circuit power supply, for the following reasons: if the gap were bigger than 2 mm, the required breakdown voltage would be higher, and if the gap were bigger than 3 mm, there would not be a breakdown; if the gap were smaller than 2 mm, the frictional resistance to flow inside the gap due to the viscosity of air at an elevated temperature would have been greater and required a higher flow rate.

The flow rate of compressed air was varied from 0.5 to 2.0 scfm in order to determine the optimum flow rate. We observed that the removal of bicarbonate ions was more effective with decreasing air flow rate. However, in the case of the 0.5-scfm flow rate, it was found that water from the reactor vessel entered back to the plasmatron as the air volume was not large enough. Thus, the present study chose 1 scfm for the air flow rate. Prior to selecting air as the compressed gas medium, we tested argon, nitrogen, and oxygen gases to generate GAD in the plasmatron. We found that all three gases were not as effective as air in reducing the concentration of bicarbonate ions in produced water. Accordingly, air was selected for the present study.

A unique feature of the present plasmatron geometry is the use of an electrical insulator made of machinable glass ceramic (material trade name Macor by Corning Inc.), which served to electrically isolate produced water from the two electrodes with the help of compressed air.

The present study utilized one ground electrode and two HV electrodes: one positioned close to the ground electrode with the gap distance of 2 mm and the other (i.e., the second HV electrode) positioned away from the ground at a distance of approximately 5 cm. Note that produced water with a high conductivity became an extension of the second HV electrode. FIG. 13A shows that the ground electrode was located at the center and lower portion in the plasmatron, while the HV electrode-1 was positioned in the upper portion in the plasmatron, closer to the body of water, and connected to the negative HV in the power supply. Of note is that the HV electrode-2 positioned on the sidewall of the reactor vessel was also connected to the power supply. When the power supply was turned on, an arc was immediately formed inside the plasmatron due to a small gap of 2-mm, gliding along the circumference of the two circular electrodes with the help of the compressed air, i.e., between the HV electrode-1 and ground electrode.

When a stable GAD was maintained inside the plasmatron (i.e., for about 10 s), the power line connecting the power supply to the HV electrode-1 was disconnected, an action that instantly generated the breakdown between the ground electrode and the HV electrode-2. Immediately, the arc inside the plasmatron jumped and stretched out to the HV electrode-2, expanding the volume of arc discharge as shown in FIG. 13C, and the stretched arc was maintained between the ground electrode and the HV electrode-2 indefinitely.

Figure 14:
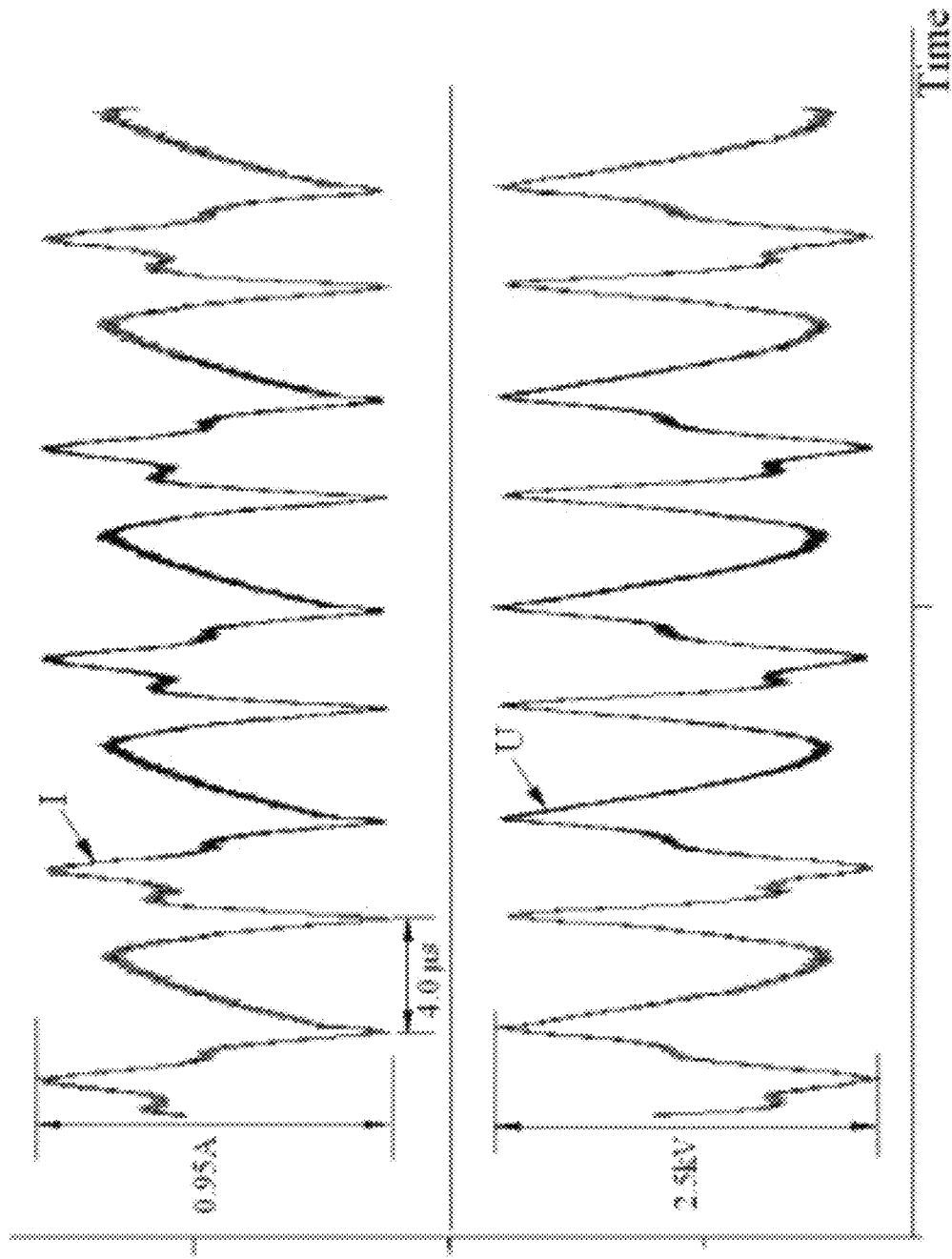
FIG. 14 is a profile of voltage (bottom) and current (top). Peak to peak voltage=2.5 kV (Calculated based on settings of 1.0 V per division×1000 for voltage probe). Peak to peak current=0.95 A (Calculated based on settings of 50 mV per division×10 A/V for current probe).

FIG. 14 shows voltage and current profiles recorded by a digital phosphor oscilloscope (TDS3014C, Tektronix) after the arc was stretched in produced water. For the measurement of the current profile, a magnetic core current probe was utilized (CM-10-L, Ion Physics Corporation, Fremont, N.H.), whereas the voltage profile was measured using a high voltage probe (P6015A, High Voltage Probe 1000×75 MHz, Tektronix).

Since the present study examined the feasibility of stretching an arc in produced water, we first wanted to determine the lowest electrolytic conductivity threshold of water, below which the present method of stretching an arc would not work. By adding NaCl to water to vary the conductivity of water samples, we found that the minimum electrolytic conductivity of water was approximately 9 mS/cm with the power supply in the study. Clearly, as the conductivity of water decreased, the ability for the arc to jump from the plasmatron to the second HV electrode diminished. Note that since the conductivity of produced water ranges from 50 to 200 mS/cm (see Ahmadun, F.I.-R., et al., *Review of technologies for oil and gas produced water treatment*. J. Hazard. Mater., 2009. 170(2): p. 530-551), and that of seawater is approximately 50 mS/cm (see Snoeyink et al., *Water chemistry*. 1980, New York: John Wiley), the present method of stretching an arc will be applicable to both produced water and seawater.

Figure 13C:
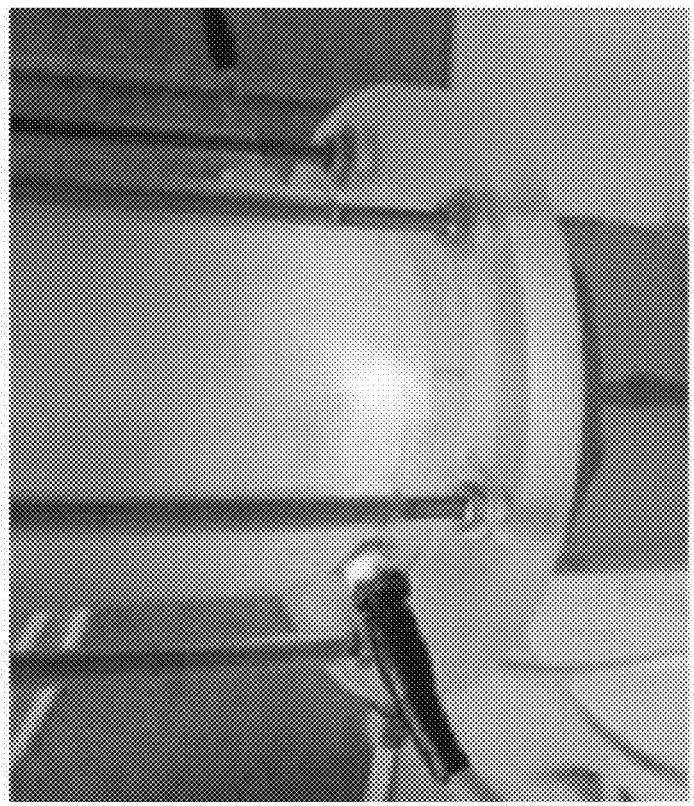
Figure 13B:
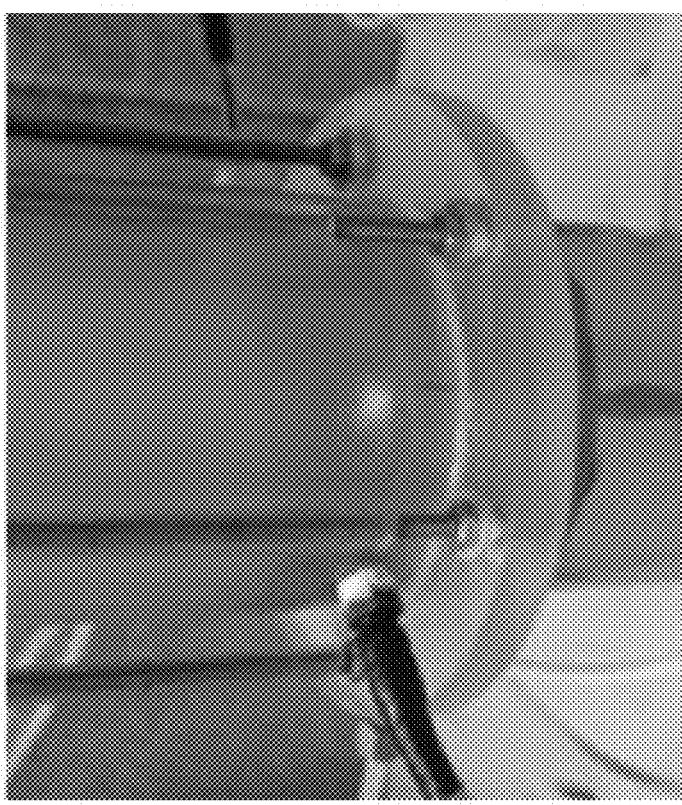

FIGS. 13B and 13C show photographs of the two arc discharges before and after stretching in produced water with a conductivity of 50 mS/cm. Before stretching (see FIG. 13B), a relatively small size plasma jet was observed to come out of the plasmatron as the compressed air pushed the arc towards the water volume. After stretching (see FIG. 13C), a larger arc discharge was present, illuminating the produced water volume. The power delivered to produced water at a flow rate of 0.1 L/min was 360 W (i.e., 1.2 kV and 0.3 A) before stretching, whereas the power corresponding to the case after stretching was 600 W (i.e., 2 kV and 0.3 A). Since the power supply used in the present study was current-controlled, delivering a constant current of 0.3 A, the output voltage was determined by the resistance between two electrodes, i.e., the distance between the two electrodes. Hence, in the case of GAD, the output voltage was 1.2 kV, delivering 360 W, while in the case of the stretched arc, it was 2 kV, delivering 600 W, due to an increased resistance between the two electrodes.

Regarding the characterization of the plasma arc discharge in water, several investigators (see Sano et al., *Properties of carbon onions produced by an arc discharge in water*. Journal of Applied Physics, 2002. 92(5): p. 2783-2788; Lange et al., *Nanocarbon production by arc discharge in water*. Carbon, 2003. 41(8): p. 1617-1623; and Guo et al., *Structure of nanocarbons prepared by arc discharge in water*. Materials Chemistry and physics, 2007. 105(2): p. 175-178), who studied the properties of carbon nanoparticles produced by arc discharge in water, reported that the temperature of arc discharge in water was approximately 4,000 K because the melting and boiling points of graphite are 3,823 and 4,203 K, respectively. In particular, Sano et al. estimated that the temperature gradient normal to the arc surface was 1,200 K/mm. Thus, the arc discharge in produced water should have a similar temperature on the surface of arc discharge. However, the characterization of the arc discharge including measuring such parameters as vibrational, translational, and electron temperature using FTIR nor Optical Emission spectroscopy was not performed, as water and the reactor wall made of acrylic in the present study were not easily transparent to infrared light or electromagnetic radiation. Furthermore, an optical fiber would have had to be inserted, at some risk, into the plasma reactor to perform such analysis, a task that was beyond of the scope of the present study.

A brief analysis of the effect of the stretched arc on the dissociation of bicarbonate ions in produced water as well as the energy cost is provided to understand the capabilities of the stretched arc. TABLE 1 shows the results of produced water treatment by GAD and changes in the water chemistry before and after stretching.

TABLE 1

Results of water chemistry before and after stretching.

| | Before Treatment (Control) | Treatment with GAD (360 W) (Without stretching) | Treatment with stretched arc (600 W) |
|---|---|---|---|
| Alkalinity (ppm as $CaCO_3$) | 664 | 492 | 354 |
| pH | 7.28 | 7.9 | 7.96 |
| Bicarbonate Alkalinity (ppm as $CaCO_3$) | 663 | 488 | 351 |
| Bicarbonate Concentration (ppm) | 809 | 596 | 428 |

The bicarbonate concentration was observed to decrease 26% in the treatment with GAD (i.e., before stretching) and 47% after stretching, indicating that the stretched arc delivered significantly better performance than the GAD. Since bicarbonate concentration decreased from 809 to 596 ppm at a flow rate of 0.1 L/min in the case of treatment with GAD, the energy cost was calculated as 1.014 kJ/L per ppm $HCO_3^-$ removed.

$$\text{Energy cost} = \frac{\left[\frac{360\ W}{\left(0.1\frac{L}{\min}\right)\left(\frac{1\ \min}{60\ s}\right)}\right]}{213\ ppm} = 1.01\ \text{kJ/L per } ppm\ HCO_3^-\ \text{removed}$$

In the case of treatment with stretched arc, bicarbonate concentration decreased from 809 to 428 ppm. Thus, the corresponding energy cost became 0.94 kJ/L per ppm $HCO_3^-$ removed.

$$\text{Energy cost} = \frac{\left[\frac{600\ W}{\left(0.1\frac{L}{\min}\right)\left(\frac{1\ \min}{60\ s}\right)}\right]}{381\ ppm} = 0.94\ \text{kJ/L per } ppm\ HCO_3^-\ \text{removed}$$

When the arc discharge is stretched in produced water, the plasma active species including UV are in direct contact with produced water. In particular, high-temperature arc is completely surrounded by produced water in the case of the stretched arc, rendering more efficient heat and mass transfer between the arc and produced water than in the GAD case. Accordingly, the stretched arc shows slightly better energy efficiency than the GAD as quantified by energy cost per unit of bicarbonate removed. More importantly, the stretched arc delivers a greater power to produced water (i.e., 360 vs. 600 W), indicating the ability to treat a larger volume of produced water in a given time, an important task due to the need to process a large volume of produced water per day.

There are two previous studies, which investigated the use of electrolyte solution as an electrode in the discharge of plasma (see Mezei, P. and T. Cserfalvi, *Electrolyte cathode atmospheric glow discharges for direct solution analysis*. Applied Spectroscopy Reviews, 2007. 42(6): p. 573-604 and Maksimov, A., V. Titov, and A. Khlyustova, *Electrolyte-as-cathode glow discharge emission and the processes of solution-to-plasma transport of neutral and charged species*. High Energy Chemistry, 2004. 38(3): p. 196-199). In both cases, atmospheric glow type plasma—not arc type plasma—was discharged adjacent to or directly above water. The present study is the first of its kind and uses a unique two-step method to stretch an arc: first to discharge plasma arc and then to stretch arc-type plasma in an electrolytic solution.

It was initially hypothesized that the ability of the arc to dissociate and remove bicarbonate ions from produced water could be dependent on arc temperature, which in general is dependent on plasma power. However, present tests with argon, nitrogen, and oxygen gases to generate the arc in water were not as effective as air at reducing the concentrations of bicarbonate ions, suggesting that air as well as the arc temperature should be the preponderant parameters responsible for the removal of bicarbonate ions.

In other words, the removal mechanism of bicarbonate ions must be due to a parameter specific to utilizing air as a carrier gas. More specifically, the generation of chemical species, which require the presence of both nitrogen and oxygen together, is the cause of the effect on bicarbonate ions. One such species, which can be generated with air as a carrier gas for plasma discharge in water, is nitric acid ($H^+NO_3^-$) (see Wright, K. C., et al., *New Fouling Prevention Method using a Plasma Gliding Arc for Produced Water Treatment*. Desalination, 2014. 345: p. 64-71). The $H^+$ ions of this acid can react with bicarbonate ions (which act as a buffer), resulting in the subsequent removal of bicarbonate ions as they are converted to $H_2O$ and $CO_2$.

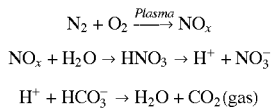

$$N_2 + O_2 \xrightarrow{Plasma} NO_x$$
$$NO_x + H_2O \rightarrow HNO_3 \rightarrow H^+ + NO_3^-$$
$$H^+ + HCO_3^- \rightarrow H_2O + CO_2(gas)$$

The chemical species generated as a result of using air as the carrier gas reacts with and consumes the bicarbonate ions. Without the bicarbonate ions, the plasma-treated produced water cannot cause a $CaCO_3$ fouling problem in heat exchanger equipment in spite of excessive amounts of calcium ions. Hence, the ability to stretch an arc into water has capabilities in enhancing treatment effects, dependent, of course, on the carrier gas used.

The study demonstrated that for highly conductive water, a large plasma arc discharge could be formed and distributed in produced water by stretching the arc from the plasmatron to a second HV electrode positioned further away from the ground electrode, enabling the arc to traverse a water volume. The minimum electric conductivity for stretching the arc was approximately 9 mS/cm. The present method of stretching a plasma arc can be used for both seawater and produced water.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A system for stretching the discharge of plasma in a liquid, comprising:
   a container configured to hold a liquid;
   a first electrode, a second electrode and a third electrode disposed within the container, wherein the distance between the first and second electrodes is less than the distance between the first and third electrodes;
   a gas injection conduit configured to introduce a gas into the container between the first electrode and the second electrode; and
   a power supply electrically coupled to the second and third electrode with a first switch electrically coupled between the power supply and the second electrode, such that the third electrode cannot participate in the generation of plasma discharge when the switch is closed, and the second electrode cannot participate in the generation of plasma discharge when the switch is open.

2. The system of claim 1, wherein the first electrode is a ground electrode, and the second and third electrodes are high voltage electrodes.

3. The system of claim 1, wherein the system is configured to operate in a first phase with the first switch closed, and continue operation in a second phase with the first switch open.

4. The system of claim 1, wherein the system is configured to increase a flow rate through the gas injection conduit prior to turning the first switch open.

5. The system of claim 1, wherein the gas injection conduit is connected to at least one of a gas supply container and an air compressor.

6. The system of claim 5, wherein the at least one of a gas supply container and an air compressor comprises at least one of air or oxygen.

7. The system of claim 1, wherein the container has an open top.

8. The system of claim 1, further comprising:
   a fourth electrode disposed within the container and electrically coupled to the power supply.

9. The system of claim 8, wherein the fourth electrode is a high voltage electrode.

10. The system of claim 8, wherein a second switch is electrically coupled between the third electrode and the power supply.

11. The system of claim 10, wherein the system is configured to operate in a first phase with the first and second switch closed, and continue operation in a second phase with the first switch open and the second switch closed, and continue operation in a third phase with the first and second switch open.

* * * * *